United States Patent Office 3,642,873
Patented Feb. 15, 1972

---

3,642,873
PROCESS FOR THE MANUFACTURE OF PHENYL ESTERS AND PHENOL FROM BENZENE
Lothar Hörnig, Frankfurt am Main, and Therese Quadflieg, Kelkheim, Taunus, Germany (both % Farbwerke Hoechst AG., Frankfurt am Main, Germany)
No Drawing. Filed Apr. 3, 1967, Ser. No. 627,679
Claims priority, application Germany, Apr. 9, 1966, F 48,917
Int. Cl. C07c 69/14, 69/24, 69/00
U.S. Cl. 260—479 R    14 Claims

ABSTRACT OF THE DISCLOSURE

Preparation of phenylesters and if desired phenol by reaction of benzene, carboxylic acids and molecular oxygen in the presence of a noble metal of group VIII of the Mendeleeff Periodic Table as catalyst.

---

The present invention relates to a process for the manufacture of phenyl esters and, if desired, phenol from benzene.

Processes for making phenol by direct oxidation of benzene with oxygen have already been known. They are, for example, thermal processes which are performed at very high temperatures of about 800° C. and in which the phenol formed is easily susceptible to further oxidation so that considerable losses of yield occur. In the presence of catalysts, the oxidation can be carried out at temperatures of about 400° C., whereby, however, undesired diphenyl is obtained in addition to benzene.

Therefore, it has not been proposed to make phenyl esters by direct action of carboxylic acids on benzene. The manufacture of, for example, phenyl acetate, starts from phenol which is reacted with acetyl chloride or acetic anhydride.

The present invention provides a process for making phenyl esters and, if desired, phenol from benzene which comprises reacting a mixture of benzene, saturated aliphatic carboxylic acids and molecular oxygen in the presence of a noble metal of group VIII of the Mendeleeff Periodic Table, having a stable valency of at most 4.

As carboxylic acids there may advantageously be used saturated aliphatic or cycloaliphatic monocarboxylic acids with up to 8 carbon atoms or the mixtures thereof. Examples of suitable substances are propionic acid, butyric acid and isobutyric acid. Acetic acid is particularly advantageous. The acids are advantageously used in as concentrated a form as possible, for example acetic acid in the form of glacial acetic acid. Small amounts of water contained in the acids can be tolerated. It is also possible to use mixtures of carboxylic acids with corresponding anhydrides.

The oxygen may be added in elementary form or in the form of air. If the reaction components are recycled, pure or substantially pure oxygen is advantageously used.

The starting materials may also contain other substances that do not interfere with the preparation of the desired reaction products, for example, saturated hydrocarbons, noble gases, carbon oxides or water.

As catalysts it is suitable to use the elements rhodium, iridium, platinum, ruthenium and advantageously palladium. The metals may also be used in admixture with one another.

The noble metals or their mixtures may be used alone, for example in colloidal form. It is, however, advantageous, particularly if the reaction is carried out in the gaseous phase, to support the noble metal serving as a catalyst on a carrier in as finely a divided form as possible. Particularly suitable carrier materials are those having a large surface area, for example, aluminum oxide, aluminum silicate, silica gel, carbon, zeolites, pumice, clays, feldspars, or molecular sieves.

The concentration of the noble metal on the carrier may vary within wide limits. In many cases, it suffices to use very small concentrations of noble metal, for example 0.1 to 10% by weight calculated on the total weight of the carrier/catalyst system. It is, however, also possible to obtain phenyl esters or phenol using concentrations of less than 0.1% by weight, for example down to 0.05% by weight of even less. The process may of course also be carried out successfully using concentrations of above 10% by weight. The noble metals are applied to the carrier by known methods. Besides noble metals, the catalyst may also contain small amounts, for example up to 50 atom percent, of other metals that are not effective per se, for example, gold, or copper.

Particularly good results are obtained with the additional use of activators. The latter may be salts of strong bases and weak acids, for example, carbonates or acylates of alkali metals or alkaline earth metals. As activators it is also possible to use salts that form a buffer system with the carboxylic acid used, for example, sodium phosphates or borax. It is particularly advantageous to use as activator an alkali metal salt of the carboxylic acid to be reacted with benzene and oxygen, for example an acetate, if acetic acid is reacted. For the reaction of acetic acid, an alkali metal acetate is, for example, often used. Depending on the mode of executing the reaction, the activator may be present in a solid form supported on the carrier or it may be dissolved or suspended in the liquid reaction components. The amounts of activator used may vary within wide limits.

The reaction temperature may vary within wide limits, depending on the choice of the carboxylic acid or the other reaction conditions such as, for example, the boiling temperature of the carboxylic acid under the pressure conditions used, or the decomposition temperature of the ester formed. The reaction is advantageously performed at temperatures within the range of 50 to 300° C., advantageously 100 to 250° C.

The pressure is not critical, either. The reaction can be carried out under atmospheric pressure, reduced pressure or superatmospheric pressure. It is generally advantageous to use pessures within the range of 1 to 50 atmospheres absolute, preferably 1 to 10 atmospheres absolute.

In a particularly advantageous mode of executing the process of the invention, the latter is carried out in the gaseous or vapor phase. In this mode of proceeding, the starting materials are conducted in the gaseous state over the catalyst supported on a carrier. The process may also be carried out in the liquid phase, in which case the carboxylic acid is brought in a liquid form in contact with the catalyst in the presence of benzene and oxygen. Finally, the process may be carried out in the so-called trickling phase, the carboxylic acid trickling down in a liquid form in the presence of benzene and oxygen over the catalyst which is present in a fixed state in the reaction zone.

The mixing ratios of the individual reactants may vary within wide limits. In many cases an excess amount of benzene and oxygen is used. When carrying out the process in practice, care must be taken, however, that the mixing ratios of the components are outside the explosive range.

The unreacted proportions of benzene, carboxylic acid and oxygen are advantageously recycled.

By the reaction, a mixture of the phenyl ester of the carboxylic acid used and, if desired, phenol is obtained. The mixing ratio of the two products may vary within wide limits depending on the reaction conditions, for example, temperature, pressure, residence time and water content of the catalyst.

The reaction mixture containing the ester and, if desired, phenol may be worked up by known methods. The ester may be used as such or, if desired, converted into phenol by hydrolysis or thermal splitting.

The process in accordance with the invention enables two valuable aromatic products, phenol and phenyl ester, to be obtained from commercial starting materials, i.e. benzene and, for example, acetic acid by catalytic oxidation at relatively low temperatures.

The following examples serve to illustrate the invention but are not intended to limit it, the yields being in percent by weight calculated on reacted benzene.

EXAMPLE 1

Into a heatable reaction tube of an internal diameter of 20 mm., charged with 250 cc. catalyst there were introduced, per hour, under atmospheric pressure, at a catalyst temperature of 130° C., 1 mole benzene, 1 mole acetic acid and 0.4 mole oxygen in the gaseous or vaporous state. The catalyst consisted of balls of lithium-spinel of a diameter of 4 mm., serving as a carrier material and contained 2% by weight metallic palladium in a finely divided form and 2% by weight sodium acetate. The mixture of products leaving the reactor was cooled and the condensate so obtained was worked up by distillation. There were obtained, per hour, 2.3 g. acetic acid phenyl ester and 0.5 g. phenol. An almost 100% yield was obtained. After separating the reaction products, the unreacted amounts of the starting substances were recycled to the catalyst.

EXAMPLE 2

Into a heatable reaction tube of an internal diameter of 20 mm., charged with 300 cc. catalyst there were introduced, per hour, at an internal temperature of the reactor of 185° C. under a pressure of 2 atmospheres absolute 0.8 mole benzene, 2 moles propionic acid and 0.4 mole oxygen in the form of air in the vaporous or gaseous state. The catalyst consisted of balls 3 mm. in diameter of sintered silicic acid as a carrier material and contained 2.3% by weight metallic palladium, 0.2% by weight gold and 5% by weight lithium propionate. From the reaction mixture leaving the reactor 1 g. phenol and 3.2 g. propionic acid phenyl ester were obtained, per hour. The yield was 96%.

EXAMPLE 3

Into a steel reactor of an internal diameter of 20 mm., charged with 300 cc. catalyst there were introduced, per hour, under a pressure of 6 atmospheres absolute at a temperature of the catalyst of 190° C., 0.5 mole commercial benzene, 2.5 moles acetic acid of 98% strength and 0.4 mole oxygen in the vaporous or gaseous state. The catalyst consisted of balls 3 mm. in diameter of aluminum silicate and contained 2.8% by weight metallic palladium and 0.4% by weight platinum metal in a finely divided form and furthermore 2.5% by weight disodium hydrogen phosphate as an activator. There were formed, per hour, 1.8 g. phenol and 2 g. acetic acid phenyl ester. The yield was 97%.

EXAMPLE 4

Into a heatable reaction tube of an internal diameter of 25 mm. and a height of 1000 mm., charged with 500 cc. catalyst, a solution of 0.5 mole benzene, 1.8 mole acetic acid and 0.3 mole acetic anhydride was introduced, per hour, by a pump under a pressure of 11 atmospheres absolute at an internal temperature of the reactor of 145 to 150° C. Simultaneously 0.3 mole oxygen were introduced into the reactor. The reactor components were introduced at the head of the reaction tube. The product leaving the reactor was cooled to room temperature, released to atmospheric pressure and worked up by distillation. 1.2 g. acetic acid phenyl ester were formed per hour. The yield was 99%.

EXAMPLE 5

A pre-evaporated mixture of 0.33 mole benzene and 0.33 mole acetic acid was conducted, per hour, together with 3 litres oxygen and 1.5 litres nitrogen at 170° C. under atmospheric pressure over a catalyst placed in a heatable glass reactor of an internal diameter of 20 mm. and a length of 300 mm. The catalyst consisted of a carrier of silica gel of a particle size of 0.25 to 0.5 mm. in diameter, impregnated with 3% by weight palladium and 3% by weight gold and containing furthermore 3% by weight potassium acetate. The latter could be applied in the full amount or in portions to the metal catalyst already in the preparation of the catalyst or in the course of the reaction, in the latter case while being dissolved in the acetic acid used.

From the reaction product 1.96 g. acetic acid phenyl ester were separated, per hour, by distillation. This corresponded to an almost 100% selectivity, calculated on the benzene. The unreacted proportions of the starting substances were recycled to the catalyst.

The acetic acid phenyl ester so obtained was split into phenol and ketene in a quartz tube at a temperature of 630° C. with a residence time of 8.3 seconds. The extent of conversion of ester was 14%, the yield of phenol was 84% and the yield of ketene 79%.

EXAMPLE 6

A mixture of 20 g. benzene, 80 g. acetic acid and 9.6 g. potassium acetate was heated under reflux (96 to 98° C.) together with a finely divided catalyst consisting of 2.16 g. palladium containing 10 atom percent copper, while stirring and passing 2.5 liters oxygen, per hour, through the mixture. The catalyst had been obtained by common reduction of the metal chlorides with sodium hydride in an aqueous ethanolic solution. After reacting for 5 hours and filtering off the catalyst, 0.4 g. phenyl acetate could be separated by distillation from the unreacted mixture of benzene and acetic aicd. Besides traces of $CO_2$, no further by-products were obtained.

We claim:
1. A process for the manufacture of phenyl esters or mixtures of phenyl esters and phenol from benzene, oxygen and a carboxylic acid which comprises reacting a mixture of benzene, a saturated aliphatic carboxylic acid with up to 4 carbon atoms and molecular oxygen at temperatures within the range of 50 to 300° C. and under a pressure within the range from 1 to 50 atmospheres absolute in the presence of at least one noble metal selected from the group consisting of ruthenium, rhodium, palladium, iridium and platinum.
2. The process as claimed in claim 1, and wherein the noble metal contains up to 50 atom percent of copper.
3. A process as claimed in claim 1, wherein the carboxylic acid is acetic acid.
4. A process as claimed in claim 1, wherein the noble metal is palladium.
5. A process as claimed in claim 1, wherein the noble metal is supported on a carrier.
6. A process as claimed in claim 5, wherein the concentration of the noble metal on the carrier is in the range of from 0.1 to 10% by weight calculated on the total weight of the carrier/catalyst system.
7. A process as claimed in claim 1, wherein the noble metal contains up to 50 atom percent of gold.
8. A process as claimed in claim 1, and wherein an activator is additionally used, said activator being a carbonate, or a carboxylate of an alkali metal or an alkaline earth metal or a salt forming a buffer system with a carboxylic acid employed in the reaction selected from the group consisting of sodium phosphate and borax.
9. A process as claimed in claim 8, wherein a carbonate of an alkali metal or an alkaline earth metal is used.

10. A process as claimed in claim 8, wherein an alkali metal salt of a carboxylic acid is used.

11. A process as claimed in claim 8 wherein the salt forming the buffer system with the carboxylic acid employed in the reaction is a sodium phosphate or borax.

12. A process as claimed in claim 1, wherein a temperature within the range of 100 to 250° C. is used.

13. A process as claimed in claim 1, wherein a pressure within the range of 1 to 10 atmospheres absolute is used.

14. A process as claimed in claim 1, wherein the reaction is carried out in the gaseous or vaporous phase.

References Cited

UNITED STATES PATENTS 3,418,361  12/1968  Kaeding et al. _____ 260—476

OTHER REFERENCES

Davidson, et al., Chemistry and Industry (Mar. 12, 1966), p. 457.

JAMES A. PATTEN, Primary Examiner

U.S. Cl. X.R.

260—521 R, 585.5

UNITED STATES PATENT OFFICE
CERTIFICATE OF CORRECTION

Patent No. 3,642,873          Dated February 15, 1972

Inventor(s) Hornig and Quadflieg

It is certified that error appears in the above-identified patent and that said Letters Patent are hereby corrected as shown below:

In the Heading:

After "am Main, Germany)" insert --, assignors to Farbwerke Hoechst Aktiengesellschaft vormals Meister, Lucius & Bruning, Frankfurt am Main, Germany--

Signed and sealed this 25th day of July 1972.

(SEAL)
Attest:

EDWARD M. FLETCHER, JR.         ROBERT GOTTSCHALK
Attesting Officer               Commissioner of Patents